(12) United States Patent
Wang et al.

(10) Patent No.: US 9,414,134 B2
(45) Date of Patent: Aug. 9, 2016

(54) SECURE WAVELENGTH SELECTIVE SWITCH-BASED RECONFIGURABLE BRANCHING UNIT FOR SUBMARINE NETWORK

(71) Applicant: NEC Laboratories America, Inc., Princeton, NJ (US)

(72) Inventors: Ting Wang, West Windsor, NJ (US); Ryuji Aida, Tokyo (JP); Philip Ji, Cranbury, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/504,597

(22) Filed: Oct. 2, 2014

(65) Prior Publication Data

US 2015/0093116 A1 Apr. 2, 2015

Related U.S. Application Data

(60) Provisional application No. 61/885,566, filed on Oct. 2, 2013, provisional application No. 61/891,957, filed on Oct. 17, 2013.

(51) Int. Cl.
*H04J 14/02* (2006.01)
*H04B 10/00* (2013.01)
(Continued)

(52) U.S. Cl.
CPC ........... *H04Q 11/0005* (2013.01); *H04B 10/80* (2013.01); *H04J 14/0205* (2013.01); *H04J 14/0212* (2013.01); *H04J 14/0213* (2013.01); *H04J 14/0221* (2013.01); *H04Q 11/0062* (2013.01); *H04Q 2011/0037* (2013.01)

(58) Field of Classification Search
CPC .......... H04Q 11/0005; H04Q 11/0062; H04Q 2011/0037
USPC ..................................... 398/83, 104
See application file for complete search history.

(56) References Cited

U.S. PATENT DOCUMENTS

| | | | | |
|---|---|---|---|---|
| 6,233,076 | B1 * | 5/2001 | Iwata ................ | H04J 14/0221 398/14 |
| 7,184,666 | B1 * | 2/2007 | Li ...................... | H04J 14/0204 398/81 |
| 9,160,478 | B2 * | 10/2015 | Roorda .............. | H04J 14/0212 |

(Continued)

OTHER PUBLICATIONS

Ji et al., U.S. Appl. No. 14/454,031, filed Aug. 7, 2014, Entitled "Submarine Reconfigurable Optical Add/Drop Multiplexer With Passive Branching Unit".

Primary Examiner — Ken N Vanderpuye
Assistant Examiner — Amritbir Sandhu
(74) Attorney, Agent, or Firm — Joseph Kolodka

(57) ABSTRACT

Systems and methods for method for data transport using secure reconfigurable branching units, including receiving signals from a first trunk terminal and a second trunk terminal by branching units. Broadcasting is prevented for secure information delivery by dividing, within the branching units, the one or more signals from the first trunk terminal and the second trunk terminal into two or more sections, and sending the two or more sections to an optical coupler. Signals may be received from a branch terminal by one or more branching units using two fiber pairs, and the signals from the branch terminals may be divided into two or more groups of optical sections, wherein one of the sections includes dummy light. The divided signals from the first trunk terminal, the second trunk terminal, and dummy light from the branch terminal may be merged, and the merged signal sent to the branch terminal.

20 Claims, 4 Drawing Sheets

(51) Int. Cl.
*H04Q 11/00* (2006.01)
*H04B 10/80* (2013.01)

(56) References Cited

U.S. PATENT DOCUMENTS

| | | | | |
|---|---|---|---|---|
| 2005/0276605 A1* | 12/2005 | Pain | H04J 14/0204 | 398/79 |
| 2005/0281295 A1* | 12/2005 | Fishman | H04J 14/0204 | 370/535 |
| 2005/0281557 A1* | 12/2005 | Fishman | H04J 14/0204 | 398/49 |
| 2007/0237524 A1* | 10/2007 | Gerstel | H04J 14/0204 | 398/83 |
| 2008/0074731 A1* | 3/2008 | Takeyama | H01S 3/06758 | 359/333 |
| 2008/0267631 A1* | 10/2008 | Collings | H04J 14/0205 | 398/97 |
| 2011/0311236 A1* | 12/2011 | Aida | H04B 10/2537 | 398/193 |
| 2012/0114335 A1 | 5/2012 | Marcerou et al. | | |
| 2012/0121267 A1* | 5/2012 | Wang | H04J 14/0221 | 398/83 |
| 2012/0163825 A1* | 6/2012 | Wu | G02B 6/29313 | 398/85 |
| 2013/0259055 A1 | 10/2013 | Ji et al. | | |
| 2013/0259475 A1 | 10/2013 | Ji et al. | | |
| 2014/0037284 A1* | 2/2014 | Aida | H04J 14/0201 | 398/7 |
| 2014/0126903 A1* | 5/2014 | Kaneoka | H04J 14/0205 | 398/48 |
| 2015/0043905 A1* | 2/2015 | Graves | H04Q 11/0005 | 398/25 |
| 2015/0043920 A1* | 2/2015 | Ji | H04J 14/021 | 398/83 |
| 2015/0055664 A1* | 2/2015 | Kanonakis | H04L 12/40136 | 370/535 |
| 2015/0093111 A1* | 4/2015 | Wang | H04Q 11/0005 | 398/48 |
| 2015/0093116 A1* | 4/2015 | Wang | H04Q 11/0005 | 398/104 |
| 2015/0155964 A1* | 6/2015 | Han | H04J 14/0212 | 398/50 |
| 2015/0171987 A1* | 6/2015 | Boertjes | H04B 10/0775 | 398/83 |
| 2015/0180603 A1* | 6/2015 | Darling | H04J 14/0212 | 398/49 |
| 2015/0200742 A1* | 7/2015 | Kamalov | H04J 14/021 | 398/85 |

* cited by examiner

SECURE WAVELENGTH SELECTIVE SWITCH-BASED RECONFIGURABLE BRANCHING UNIT FOR SUBMARINE NETWORK

RELATED APPLICATION INFORMATION

This application claims priority to provisional application Ser. No. 61/885,566 filed on Oct. 2, 2013 and provisional application Ser. No. 61/891,957 filed on Oct. 17, 2013, both incorporated herein by reference. This application is related to co-pending U.S. application Ser. No. 14/504,639, which is filed concurrently herewith and herein incorporated by reference.

BACKGROUND

1. Technical Field

The present invention relates to submarine network's, and more particularly, to secure WSS-based reconfigurable branching units for submarine networks.

2. Description of the Related Art

Submarine optical networks form the backbone of global communication networks, and generally include main trunks that connect trunk terminals (e.g., point-to-point cable links with in-line optical amplifiers to boost the signal power), and branch paths which connect to other branch terminals. A branching unit (BU) is a network element that splits the signal between the main trunk and the branch path and vice versa. This allows the signals from different paths to share the same fiber instead of installing dedicated fiber pairs for each link. BUs generally perform signal splitting and combining functions optically, and thus the BU has a similar function as an optical add/drop multiplexer (OADM) in terrestrial wavelength division multiplexing (WDM) networks.

Existing BU and submarine networks have fixed, pre-determined wavelength arrangements, and thus no reconfiguration is required after installation. However, a disadvantage of this arrangement is that the traffic in the global communication network is becoming more dynamic as internet-based traffic becomes more dominating. There have been efforts to add reconfigurability to networks, including employing tunable optical filters, replacing a single optical filter with an array of filters, and employing a wavelength-selective switch. However, each of the above-mentioned approaches includes drawbacks (e.g., limited quantity of BU configurations, added complexity to the BU, no full reconfigurability of BU, security issues, etc.), which are not desirable in submarine networks.

SUMMARY

A method for data transport using one or more secure reconfigurable branching units, including receiving one or more signals from a first trunk terminal and a second trunk terminal by one or more branching units; preventing broadcasting for secure information delivery by dividing, within the branching unit, the one or more signals from the first trunk terminal and the second trunk terminal into two or more sections, and sending the two or more sections to an optical coupler; receiving one or more signals from a branch terminal by one or more branching units using, two fiber pairs; dividing the one or more signals from the one or more branch terminals into two or more groups of optical sections, wherein one of the sections includes dummy light merging the divided signals from the first trunk terminal, the second trunk terminal, and dummy light from the branch terminal; and sending a merged signal to the branch terminal A system for data transport, using one or more secure reconfigurable branching units, including one or more branching units configured to receive one or more signals from a first trunk terminal and a second trunk terminal, the one or more branching units being further configured to: prevent broadcasting for secure information delivery by dividing, within the branching unit, the one or more signals from the first trunk terminal and the second trunk terminal into two or more sections, and sending the two or more sections to an optical coupler; receive one or more signals from a branch terminal using, two fiber pairs; divide the one of more signals from the one or more branch terminals into two or more groups of optical sections, wherein one of the sections includes dummy light; merge the divided signals from the first trunk terminal, the second trunk terminal, and dummy light from the branch terminal; and send a merged signal to the branch terminal.

These and other features and advantages will become apparent from the following, detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
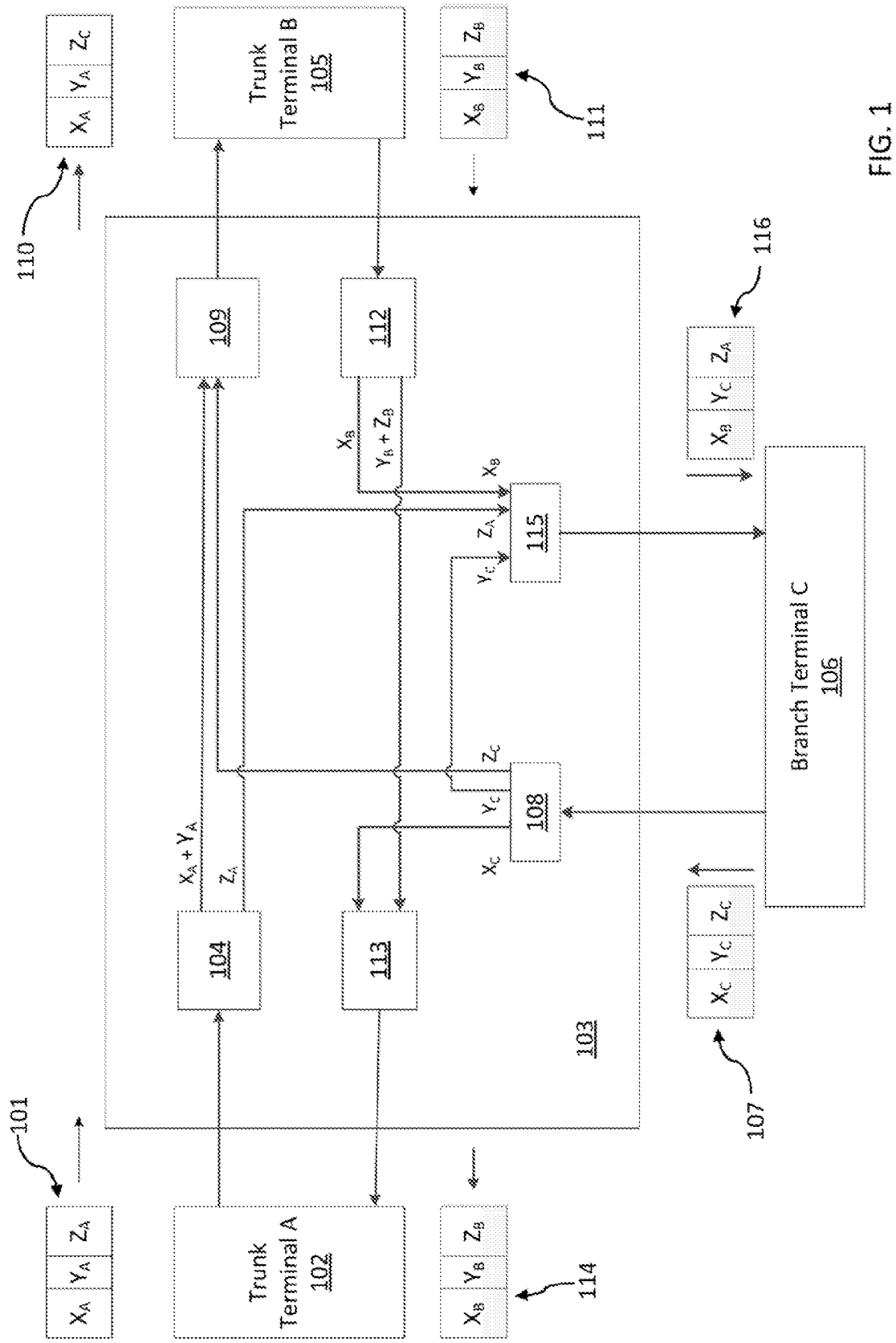
FIG. 1 is a block/flow diagram of a system and method for data transport using a WSS-based secure reconfigurable BU architecture with a single branch fiber pair in accordance with an exemplary embodiment of the present principles.

As indicated above, there are several drawbacks to existing BU and submarine networks, but the system and method according to the present principles does not include the above-mentioned drawbacks. The system and method according to the present principles may employ a Wavelength Selective Switches (WSS)-based reconfigurable Branching Unit (BU), wherein one or more WSSs are employed at each fiber input to separate channels between those going to a trunk terminal and those going to a branch terminal. As each channel reaches only the output port for the intended destination, no unwanted data/signals (e.g., those signals that are not supposed to be received at the particular terminal) are leaked. It is noted that the present principles eliminate any Broadcast and Select (B&S) architecture, and as such, do not include the security issues that B&S architectures include.

In one embodiment, per-channel independent control may be employed, and as a result, the WSS's deliver full reconfigurability at the BU. The system and method according to the present principles may employ four 1×2 WSS's and four 2:1 optical couplers. In another embodiment, the system and method may employ another four WSS's to replace the four couplers, making the total number of WSS's to be eight. In another embodiment, the system and method may employ a splitter and two wavelength blockers (WB's—a WB is essentially a 1×1 WSS, where each channel can be either at Pass (with/without attenuation) or Blocked state). Thus, the BU in this embodiment may consist of eight WB's, four splitters, and four couplers. In another embodiment, the system and method may combine the changes in the first two embodiment discussed above.

In yet another embodiment, WSS may be employed to achieve both the add/drop reconfiguration function and the channel separation function. Thus, this embodiment may deliver full reconfigurability, and may send each channel to the correct destination only. Furthermore, this embodiment may employ only one fiber pair between the BU and the Branch Terminal (BT), thereby significantly reducing hardware costs (e.g., fiber cable, repeater, WSS, etc.). In one embodiment, the present principles advantageously provide for full reconfigurability (e.g., $2^K$, where K is the number of Wavelength Division Multiplexed (WDM) channels), for secure transmission (e.g., no broadcasting, and only intended channels arrive at each terminal), for low hardware cost (e.g., single branch fiber pair, reducing number of WSSs), and simple control (e.g., multiple WSSs may be configured concurrently using a same controller).

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a system/method for a WSS-based secure reconfigurable BU architecture with a single branch fiber pair is illustratively depicted in accordance with the present principles. In one embodiment, main components of this secure reconfigurable BU are wavelength-selective switches (WSSs) 104, 108, 112 and optical couplers 109, 113, 115. The main design may employ two 1×2 WSSs 104, 112, one 1×3 WSS 108, two 2:1 couplers 109, 113, and one 3:1 coupler 115. It is noted that these are commonly available optical components, and the technologies for these components are mature.

In one embodiment, during the operation of the BU according to the present principles, the optical spectrum may be divided into three separate sections, which for convenience are denoted as X, Y, and Z. The optical channels in these three sections may have different wavelengths/frequencies. Among them, Section X and Section Z, for example, may cover the same amount of spectrum (but may include different wavelengths/frequencies), therefore each of them may cover equal to or less than half of the total available optical spectrum. The remaining part in this example is Section Y. The actual optical channels within each section do not need to be contiguous, therefore these sections can be mixed spectrally, and each section (X, Y, Z) may cover multiple optical channels.

It is noted that in one embodiment, the combined spectral width of Section X may be the same as the combined spectral width of Section Z. In another embodiment, both Section X and Section Y may each cover half of the total spectrum, and in that case, Section Y will include no channel. In another embodiment, both Section X and Section Z may include no channel, and then Section Y will contain the entire spectrum. It is further noted that although the above configurations are illustratively depicted, any combinations of the spectrums (e.g., X, Y, and Z) may be employed according to the present principles.

In one embodiment, the signal arriving from each terminal may be separated into three sections under the same arrangement in other words, if the $i^{th}$ WDM channel from one trunk terminal (e.g., Terminal A) belongs to Section X, then the $i^{th}$ WDM channel from the opposite trunk terminal (e.g., Terminal B) and from the branch terminal (e.g., Terminal C) may also be assigned to Section X. For illustrative purposes, the above three sections of spectrum from each terminal may be denoted with a subscript identifying the terminal name. For example, the three sections of WDM signals from Trunk Terminal A may be denoted as $X_A$, $Y_A$, and $Z_A$.

The following table is an illustration of configurations for each spectral section between each source-destination pair according to one embodiment of the present principles:

| Source Terminal | Destination Terminal | Spectral Sections |
| --- | --- | --- |
| A | B | $X_A$ and $Y_A$ |
| A | C | $Z_A$ |
| B | A | $Y_B$ and $Z_B$ |
| B | C | $X_B$ |
| C | A | $X_C$ |
| C | B | $Z_C$ |
| C | C | $Y_C$ (dummy) |

In one embodiment, WDM signals 101 (e.g., $X_A$, $Y_A$, and $Z_A$) from Trunk Terminal A 102 may enter a reconfigurable Branching Unit (BU) 103, and a Wavelength Selective Switch (WSS) 104 may separate them into two parts. The first part may include $X_A$ and $Y_A$ (which may be intended for the opposite Trunk Terminal B 105), and may exit Output 1 of the WSS 104. The second part may include $Z_A$, which may be intended for Branch Terminal C 106, and may exit Output 2 of the WSS 104. The signal arriving from Branch Terminal C 106 (e.g., including $X_C$, $Y_C$, and $Z_C$) may pass through a 1×3 WSS 108, and may be separated into 3 parts. The first part may include $X_C$, which may be intended for Terminal A 102; the second part may include $Z_C$, which may be intended for Terminal B 105, and the last part may include $Y_C$, which may include filling (e.g., dummy) light. The $Z_C$ part may be sent to a 2:1 optical coupler 109, which may combine it with the signal $X_A$ and $Y_A$ from the WSS 104. The output of the coupler 109 may include $X_A + Y_A + Z_C$ 110, which may include all of the signals for Trunk Terminal B 105. This combined signal may then be sent to Terminal B 105 via, for example, a trunk fiber cable.

In one embodiment, a similar operation is performed for the WDM signals 111 (e.g., $X_B$, $Y_B$, and $Z_B$) from Trunk Terminal B 105. The signals 111 may firstly be separated by one or more 1×2 WSSs 112 into 2 parts. The first part may include $X_B$, which may be intended for Branch Terminal C 106, and may exit Output 1 of the WSS 112. The second part may include $Y_B$ and $Z_B$, and may exit Output 2 of the WSS 112. This part may be combined with $X_C$ from one or more 1×3 WSSs 108 at the input from Terminal C 106 by one or more 1:2 couplers 113. The combined signal 114 may include $X_C + Y_B + Z_B$, which may include all the signals for Trunk Terminal A 102, and may be sent to Terminal A 102 via, for example, a trunk fiber cable.

In one embodiment, the signals 107 (e.g., $X_C$, $Y_C$, and $Z_C$) for Branch Terminal C may include 3 parts. The first part may include the signals sent from Terminal A 101, which may include $Z_A$ from Output 2 of the WSS 104. The second part may be the signal sent from Terminal B 105, which may be $X_B$ from Output 1 of the WSS 112. The last part may include the dummy light. Since the total number of WDM channels for the Branch Terminals (e.g., the sum of the signals from both Trunk Terminals) is usually less than the total number of available WDM channels in the system (e.g., 48, 96. etc.), dummy channels may be employed to fill in spectrum gaps to make the combined power equal to the optimum setting of the submarine cable (e.g., especially the repeaters in the cable).

It is noted that the dummy light does not need to have the same number of channels, as long as same optical power is delivered. In one embodiment, signals arriving from Branch Terminal C 106 already include dummy light (e.g., $Y_C$). This part of the light may be separated out by the WSS 107 when entering the BU 103, and may form the third part of the signal for Branch Terminal C 106. A 3:1 optical coupler (115) may be employed, to combine these 3 parts together, and form the combined signal 166, which may include $X_B + Y_C + Z_A$, which may be sent to Terminal C 106. In one embodiment, the WSSs 104, 108, 112 in the system and method according to the present principles may include attenuation functions, and thus may balance power among different signal hands, or among individual WDM channels.

In the above embodiment, it may be assumed for simplicity of illustration that substantially the same amount of traffic exists for both directions in the duplex transmission system (e.g., A=>B traffic includes the same number of channels as B=>A traffic, etc.). However, it is noted that the BU architecture according to the present principles may also support systems with asymmetric channel count in the bidirectional transmission. For example, if A=>B traffic and B=>A traffic does not have the same channel count, the higher number may be used in wavelength arrangement and WSS configuration, and dummy channels may be employed to fill in the gap in the transmission link with the lower number of channels.

As the reconfigurable BU system and method according to the present principles does not use B&S architecture, but rather employs WSS to separate each incoming signal, there is no data security issue. It provides full reconfigurability, and may reuse dummy light for the branch path. Furthermore, it may employ only one pair of fiber in the branch link, thereby reducing the hardware cost and power consumption significantly in comparison with conventional systems and methods. The system and method according, to the present principles also may provide full reconfigurability, does not have any wavelength continuity constraint allows usage of full WDM channels, may include any number of BUs.

In one embodiment, the traffic in the bidirectional link may use different WDM channels, which may slightly increase control complexity in channel assignments. However, there is no physical limitation for such an arrangement. Many current optical transponders may be colorless (e.g., they can operate on any wavelength). This feature may be enabled by a wide availability of tunable lasers and digital coherent receivers (which may pick a target channel from among all channels without requiring filtering devices). As such, a transponder may be configured to transmit and receive signals at different wavelengths according to the present principles.

In another embodiment, all the optical couplers may be replaced by additional WSS's. For example, 2:1 couplers 109 and 113 may be replaced by 2×1 WSS's, and the 3:1 coupler 115 may be replaced by a 3×1 WSS. The operation of the reconfigurable BU remains the same. As compared with the first discussed embodiment, each channel in this embodiment may pass through the WSS twice, instead of once. Therefore, the inter-channel crosstalk may be further suppressed, and the port isolation may be further improved. As compared with the first discussed embodiment, this embodiment may be higher cost (WSS is more expensive than optical coupler), higher power consumption (WSS employs active control, while optical couplers are passive), large footprint (a 1×2 WSS is larger than a 1:2 coupler), and slightly larger optical loss the typical insertion loss of a current commercially available 1×2 or 1×3 WSS is about 4~5 dB, and the insertion loss of a 1:2 coupler is typically less than 3.5 dB).

In another embodiment, the 1×2 WSS's 104, 112 may be replaced by 1×3 WSS's and the 2:1 couplers 109, 113 may be replaced by 3:1 couplers. In this embodiment, the 3 groups (X, Y and Z) may be separated for each input signal, but the destinations may remain the same as in the first discussed embodiment. The benefit of such design is that the 3 WSS's may have the same setting for each reconfiguration, and therefore can be controlled together using a single controller. Their optics may be integrated to further reduce the size, power consumption and cost. As compared with the first discussed embodiment, if discrete WSS components are employed, the 1×3 WSS is likely to have slightly higher cost than the 1×2 WSS, and the optical insertion, loss of 3:1 coupler may be higher than 2:1 coupler.

In another embodiment, each WSS in the first discussed embodiment may be replaced with the combination of an optical splitter and one or more wavelength blockers (WBs). For example, the 2×1 WSS 104 may be replaced with a 1:2 splitter and two WBs, the 2×1 WSS 112 may be replaced with a 1:2 splitter and two WBs, and the 3×1 WSS 108 may be replaced with a 1:3 splitter and three WBs, it is noted that although the input signal may be split into 2 or 3 parts, each carrying all the input channels, the subsequent WBs may block the "unwanted" channels for the respective paths. Since the WB's may be inside the BU, and the blocking actions may be performed at the BU, no "unwanted" channels will reach an unintended destination. Therefore, the system and method according to the present principles enables a high level of data security.

It is noted that in one embodiment, the present principles may employ WSS to achieve dual purposes (e.g., providing full reconfigurability (with per-channel attenuation) and to separate signals for different destinations to avoid broadcasting, and may reduce the branch fiber pair from 2 to 1, yet provide the same switching/add/drop functions. Concurrent control among all WSSs (or among a set of WBs) may be employed to reduce control circuit hardware and complexity, power balance may be maintained without an active light source at the BU by reusing the dummy light from the incoming branching fiber to the returning branching fibers, the assignment of different channel groups may enable bidirectional transmission over single fiber pairs at each path, and different embodiments may be employed to achieve different additional goals (e.g., suppress crosstalk, improve port isolation, reduce size through using integrated components, etc.).

It is further noted that some key benefits of the system and method according to the present principles include being fully reconfigurable in all channels, thereby delivering $2^K$ configurations for each source terminal, where K is the number of WDM channels; enabling secure information delivery (e.g., because the system and method does not use broadcasting, no unintended signal may reach an unintended destination); low hardware cost due to the elimination of a second fiber pair in the branch path and using returned dummy light to achieve repeater power balance; low power consumption due to the elimination of the second fiber pair in the branch path and using returned dummy light to achieve repeater power balance; low control complexity through control sharing; and compact size through component integration.

Although the above configurations are illustratively depicted, it is noted that part or all of the above embodiments may be combined together to form other alternative configurations, and other sorts of configurations are contemplated according to various embodiments of the present principles.

Figure 2:
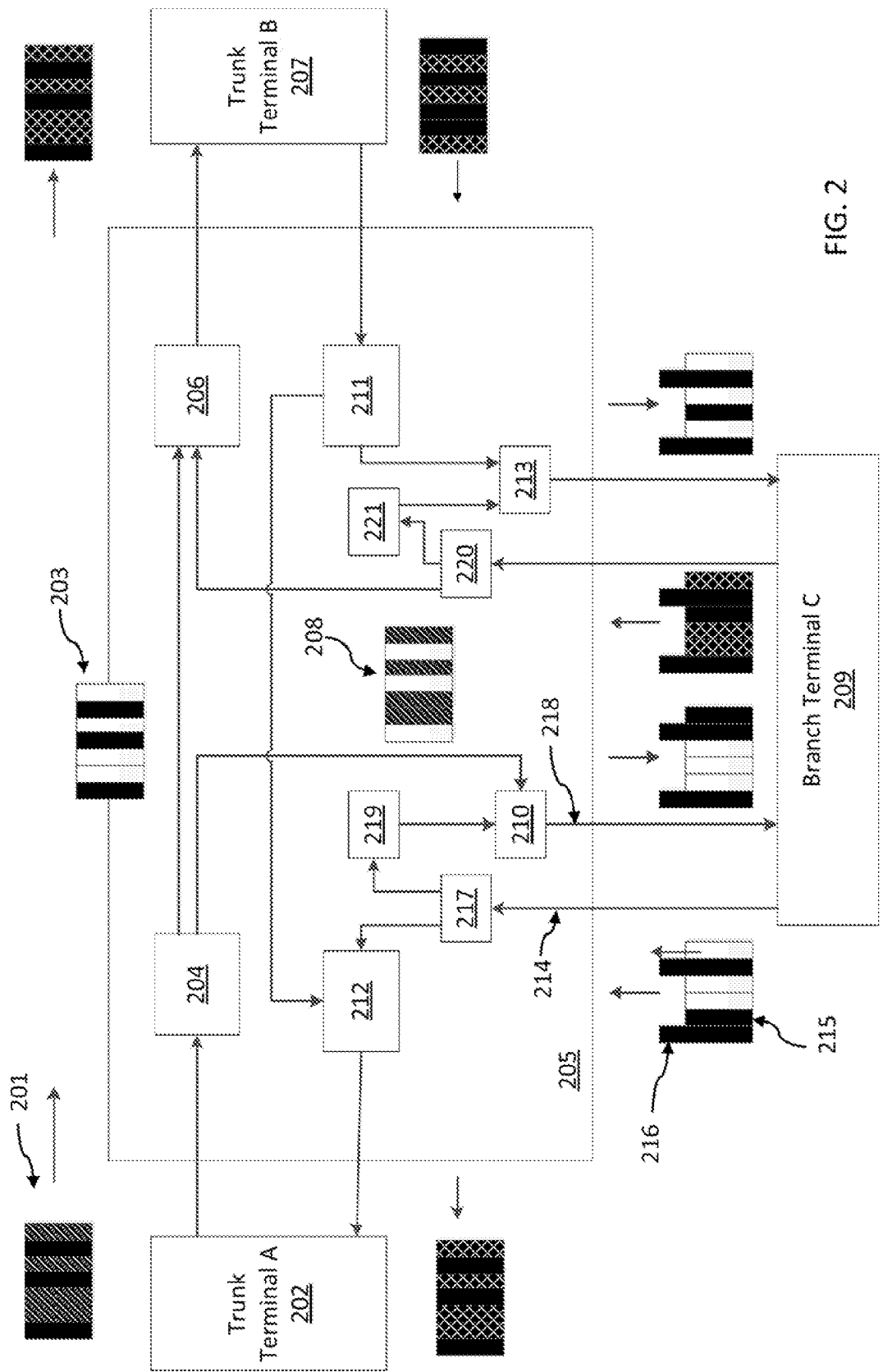
FIG. 2 is a block/flow diagram of a system and method for data transport using a WSS-based secure reconfigurable BU architecture with a two branch fiber pair in accordance with an exemplary embodiment of the present principles.

Referring now to FIG. 2, a system and method for a WSS-based secure reconfigurable BU architecture is illustratively depicted in accordance with the present principles. In one embodiment, main components of a secure reconfigurable BU 205 according to the present principles may include one or more 1×2 WSSs 204, 211, 217, 220, one or more 2:1 optical couplers 206, 210, 212, 213, and one or more optical attenuators 219, 221. It is noted that these are commonly available optical components, and the technologies for these components are mature.

In one embodiment, during the operation of the BU according to the present principles, WDM signals 201 from Trunk Terminal A 202 may enter the BU a 1×2 WSS 204 may separate the WDM signals into a plurality of different channels (e.g., 2 different channels/sections). The first section 203, which may be for Trunk Terminal B 207, may be sent to a 2:1 optical coupler 206 to be sent to Trunk Terminal B 207. The other section 208, which may be for the Branch Terminal C 209, may be sent to another 1:2 coupler 210 to be sent to Branch Terminal C 209. Because of the 1×2 WSS' capability of separating WDM channels into two separate outputs, there may be no signal broadcasting involved, and therefore only the intended ("wanted") channels reach the respective output port.

In one embodiment, a similar operation may be performed for the WDM signals from Trunk Terminal B 207. The WDM signals may be separated by a 1×2 WSS 211 into 2 paths, where one path goes to Trunk Terminal A 202 via a coupler 112, and the other goes to Branch Terminal C 209 via another 1:2 coupler 113. There may exist 2 fiber pairs between the BU and the Branch Terminals; one pair may be for traffic between A and C, and the other pair may be for traffic between B and C.

In one embodiment, the signals from Branch Terminal C 209 for Trunk Terminal A 202 may be sent through a fiber in a first fiber pair 214. Besides the useful channels 215, the signals may include dummy channels 216 to maintain the optical power level inside the fiber. It is noted that the exact number and wavelengths of dummy channels are not important, as long as the required combined power level is delivered. (In this exemplary embodiment, 2 dummy lights with higher power level are used to provide the same power equalizing function as 5 regular channels for illustrative purposes).

In one embodiment, the input 1×2 WSS 217 for a branch path may separate the dummy light and the useful channels intended for Terminal A 202. These useful channels may be combined with the selected channels from Terminal B 207 via, for example, a 1:2 coupler 212, and then may be sent to the destination terminal e.g., Terminal A 202). The dummy light may be returned to the return fiber in the same branch fiber pair 218 to be transmitted back to Branch Terminal C 209, after being combined with the filtered signal 208 from Trunk Terminal A 202 via a coupler 210. An optional optical attenuator 219, 221 may be placed in the return path of the dummy light to adjust the power level. Since all WSS's also offer per-channel attenuation function, this additional optical attenuator is optional. The attenuation function in the WSS may also be utilized to provide power equalization among the WDM channels.

In one embodiment, a similar operation may be performed for the signal between Trunk Terminal B 207 and Branch Terminal C 209. The 1×2 WSS 220 may separate the input signals into dummy light and useful signals for Terminal B 207, and may switch them to the respective outputs, where they may be combined with the appropriate signals via, for example, respective 1:2 couplers 206, 213 to be returned to the Branch Terminal C 209 or to be transmitted to Trunk Terminal B 207. When the submarine network's WDM channel arrangement is to be changed, the 1×2 WSS 220 may be reconfigured through electronic control. Since each WDM channel can be set to either port 1 or port 2 independently, $2^K$ configurations may be achieved, where K is the number of WDM channels, and as such, the system and method according to the present principles enables full reconfigurability.

In this embodiment, there may be four 1×2 WSS units 204, 211, 217, 220, and they may have the same switching status. For example, if channel X in one WSS is switched to Output 1, the same channels in the other 3 WSSs may also be switched to output 1. Because of this feature, the four WSS's may share a common control circuit, and therefore may reduce the control hardware size, power consumption and complexity. It is also possible to limber integrate the four 1×2 WSS units 204, 211, 217, 220 into a monolithic unit, since the higher port count WSS products (e.g., 1×9, twin 1×9, 1×23, etc.) are commonly available. The quad 1×2 WSS may include 12 fiber ports, which is similar to a 1×9 WSS (e.g., 10 ports), and much fewer than twin 1×9 WSS (e.g., 20 ports) and 1×23 WSS (e.g., 24 ports), and therefore is achievable. Having the monolithic unit may reduce the hardware size and cost even further by sharing the packaging, power supply circuit, or even optics for wavelength-selective switching (e.g., liquid crystal on silicon, liquid crystal, micro electromechanical system, etc.).

It is noted that in this embodiment, from the Trunk Terminal A 202, if the combination of A=>B signals and the A=>C signals is fewer than the total achievable channels, dummy light may be inserted for the unused channels. The dummy light from Trunk Terminal A may be switched together with the A=>B channels via, for example, the 1×2 WSS 204; and the same principles may be applied, for the signals from Trunk Terminal B. In any conventional systems, the fibers in the opposite directions can only carry the same amount of signals (e.g. A=>B path has the same number of channels as B=>A path, and A=>C path has the same number of channels as C=>A path). However the BU architecture according to the present principles is not so limited. Rather, the present principles may also support an asymmetric number of channels between the opposite direction fiber pairs. In one embodiment, besides switching each channel to either Output 1 or Output 2, the WSSs may also block the channel. However this case is not discussed here, since amplifier power balancing is generally employed, and thus all channels may generally be employed for one output path or another.

In another embodiment, the secure reconfigurable BU 205 may employ the same configuration and design as the first discussed embodiment with reference to FIG. 2, except that the four 1:2 couplers 206, 210, 212, 213 may be replaced by four 1×2 WSSs, and thus may share the same control circuitry, or be integrated together. As compared with the first discussed embodiment with reference to FIG. 2, each channel in this embodiment may pass through the WSS twice instead of once, and therefore the inter-channel crosstalk may be further suppressed, and the port isolation may be further improved. As compared with the first discussed embodiment with reference to FIG. 2, this embodiment may have a higher cost (WSS is more expensive than optical coupler), higher power consumption (WSS requires active control, while optical couplers are passive), a larger footprint (a 1×2 WSS is larger than a 1:2 coupler), and slightly larger optical loss (the typical insertion loss of a current commercially available 1×2 WSS is about 4~5 dB, and the insertion loss of a 1:2 coupler is typically less than 3.5 dB).

In another embodiment, the secure reconfigurable BU 205 may employ a combination of a 1:2 optical splitter and two wavelength blockers (WBs) to replace each 1×2 WSS shown in the first discussed embodiment with reference to FIG. 2. It is noted that WBs are also a widely available, mature optical component. It is essentially a 1×1 WSS, where each WDM channel can either pass or be blocked independently. For example, WSS 204 may be replaced with a splitter and two WBs according to the present principles. Although the input signal may be split into two parts, each carrying all the input channels, the subsequent WBs may block the "unwanted" channels for the respective paths. Since the WBs may be inside the BU, and the blocking actions may be performed at the BU, no "unwanted" channels may reach the unintended destination. Therefore, the system and method according to the present principles enables a high level of data security. In another embodiment, the four 1:2 couplers at the output end may be replaced by a splitter-WBs combination.

It is noted that in one embodiment, the present principles may employ WSS to achieve dual purposes (e.g., providing full reconfigurability (with per-channel attenuation) and to separate signals for different destinations to avoid broadcasting. Concurrent control among all WSSs (or among a set of WBs) may be employed to reduce control circuit hardware and complexity, reflecting of dummy light may be employed in the branch fibers to maintain power balance, and different embodiments may be employed to achieve different additional goals (e.g., suppress crosstalk, improve port isolation, reduce size through using integrated components, etc.).

It is further noted that some key benefits of the system and method according, to the present principles include being fully reconfigurable in all channels, thereby delivering $2^K$ configurations for each source terminal, where K is the number of WDM channels; enabling secure information delivery (e.g., because the system and method does not use broadcasting, no unintended signal may reach an unintended destination); power balancing repeaters with returning dummy light, which significantly reduces the quantity of dummy light and the related power consumption; low control complexity through control sharing; and compact size through component integration.

Although the above configurations are illustratively depicted, it is noted that part or all of the above embodiments may be combined together to form other alternative configurations, and other sorts of configurations are contemplated according to various embodiments of the present principles.

Figure 3:
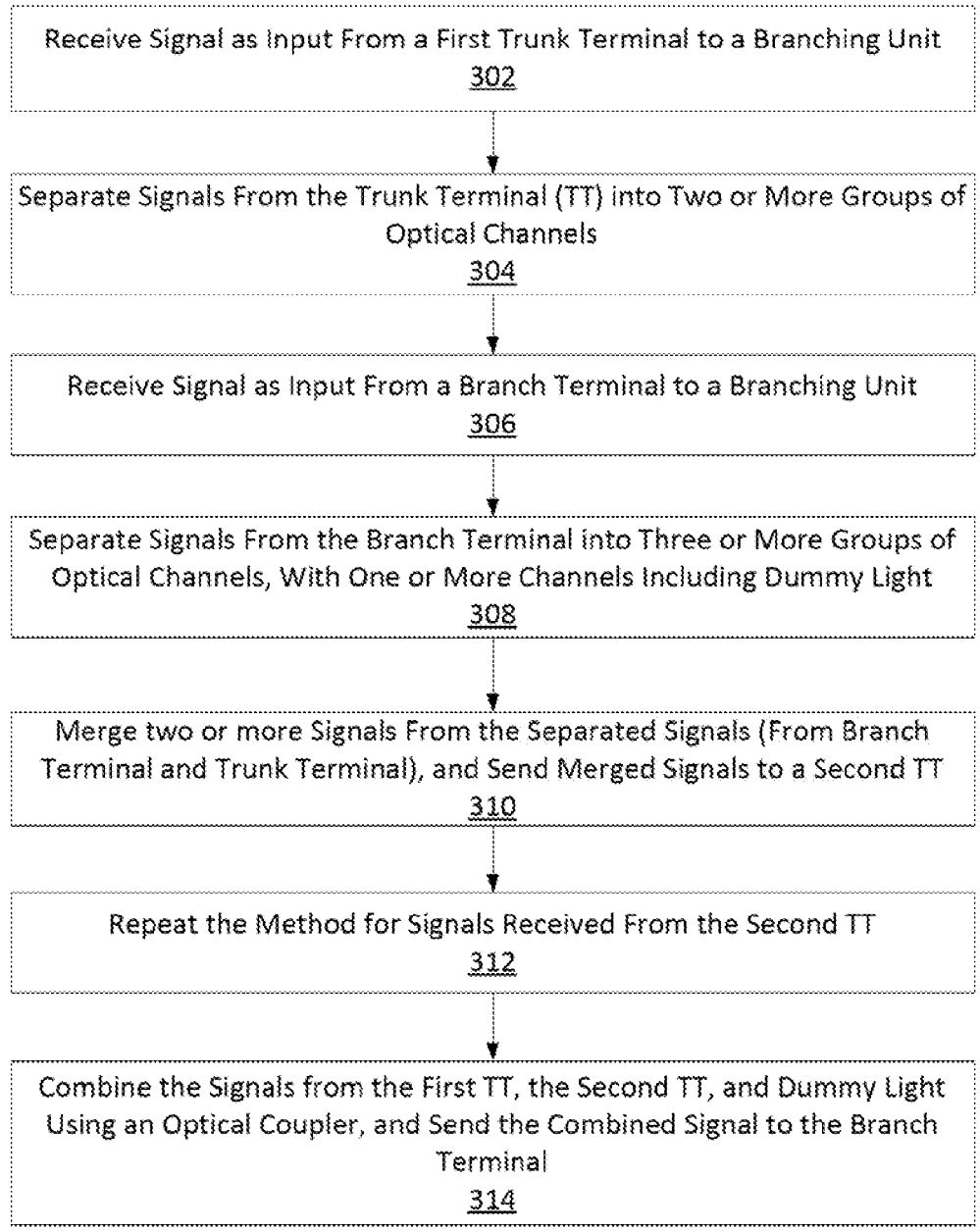
FIG. 3 is a flow diagram of a system and method for data transport using a block/flow diagram of a system and method for data transport using a WSS-based secure reconfigurable BU architecture with a single branch fiber pair in accordance with an exemplary embodiment of the present principles.

Referring now to FIG. 3, a block/flow diagram for data transport using a WSS-based secure reconfigurable BU architecture is illustratively depicted in accordance with the present principles. In one embodiment, one or more signals may be received as input from a first Trunk Terminal (TT) to a BU in block 302. The signals from the first TT may be divided into two or more groups of optical channels in block 304. One or more signals may be received as input from a Branch Terminal to a BU in block 306, and the one or more signals may be separated from the Branch Terminal into three or more groups of optical channels, with one or more channels including dummy light in block 308. Two or more signals may be merged from the separated signals (e.g., from the Branch Terminal and Trunk Terminal), and the merged signals may be sent to a second TT in block 310.

The above steps of the method may then be repeated for signals received by the BU from a second TT in block 312, and no unwanted signals may be sent to an unwanted destination. The signals from the first TT, the second TT, and dummy light may be combined using an optical coupler, and the combined signals may be sent to the branch terminal in block 314. It is noted that dummy light may be reused, and previously reflected dummy light may be added into the signal to provide a balance of optical power. It is further noted that single branch fiber pair may be employed according to the present principles. The recycling of the previously reflected dummy light may be performed through the dummy light filters and/or attenuator path. It is further noted that although the above configuration is illustratively depicted, other sorts of configurations are contemplated in accordance with the present principles.

Figure 4:
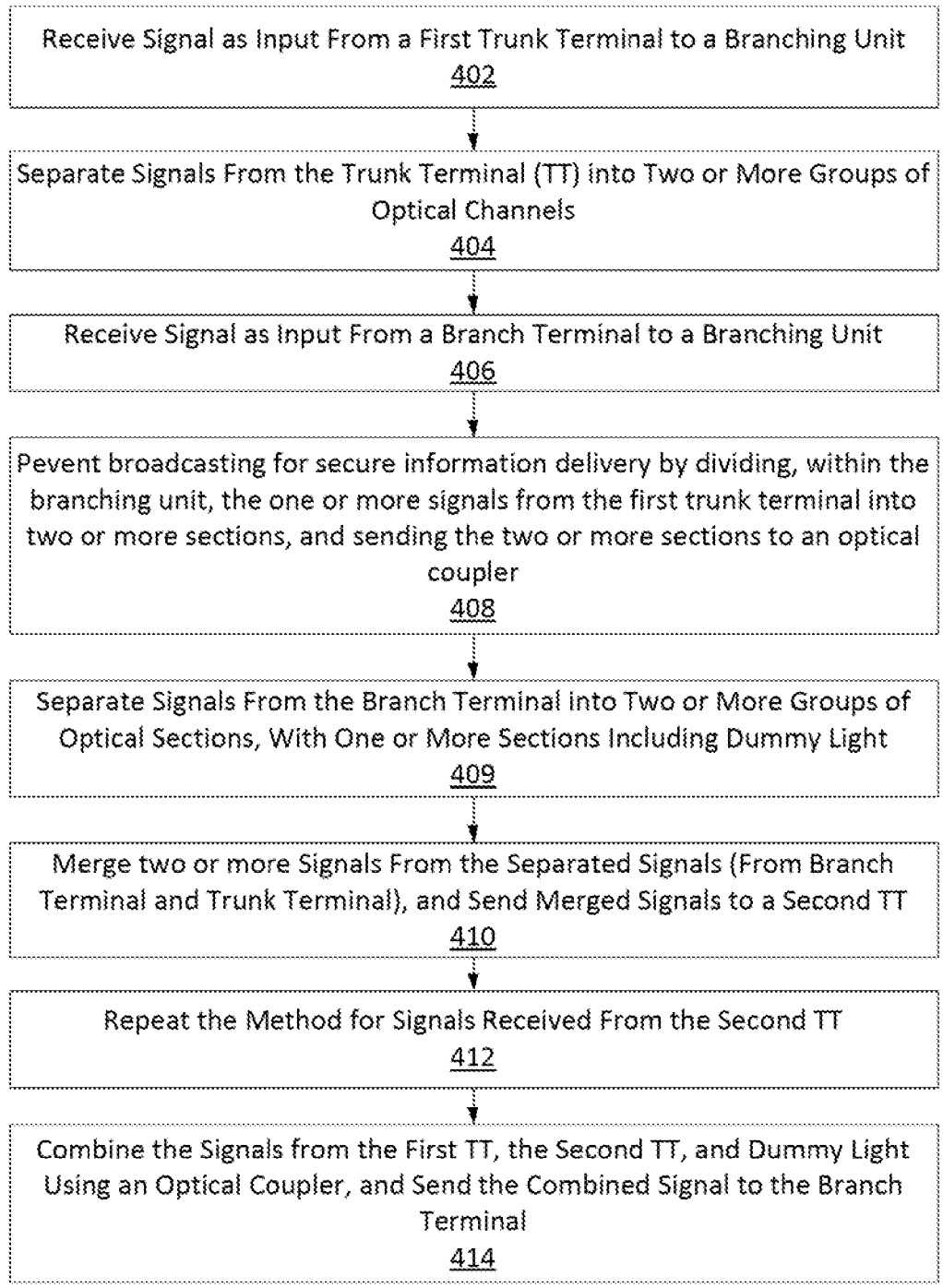
FIG. 4 is a flow diagram of a system and method for data transport using a block/flow diagram of a system and method for data transport using a WSS-based secure reconfigurable BU architecture with a two branch fiber pair in accordance with an exemplary embodiment of the present principles.

Referring now to FIG. 4, a block/flow diagram for data transport using a WSS-based secure reconfigurable BU architecture is illustratively depicted in accordance with the present principles. In one embodiment, one or more signals may be received as input from a first Trunk Terminal (TT) to a BU in block 402. The signals from the first TT may be divided into two or more groups of optical channels in block 404. One or more signals may be received as input from a Branch Terminal to a BU in block 406, and broadcasting may be prevented for secure information delivery by dividing, within the branching unit, the one or more signals from the first trunk terminal into two or more sections, and sending the two or more sections to an optical coupler in block 408. Signals may be divided from one or more branch terminals into groups e.g., two) of optical sections, wherein at least one of the sections includes dummy light in block 409. Two or more signals may be merged from the separated signals (e.g., from the Branch Terminal and Trunk Terminal), and the merged signals may be sent to a second TT in block 410.

The above steps of the method may then be repeated for signals received by the BU from a second TT in block 412, and no unwanted signals may be sent to an unwanted destination. The signals from the first TT, the second TT, and dummy light may be combined using, an optical coupler, and the combined signals may be sent to the branch terminal in block 414. It is noted that dummy light may be reused, and reused, previously reflected dummy light may be added into the signal to provide a balance of optical power. It is further noted that single branch fiber pair may be employed according to the present principles. The recycling of the previously reflected dummy light may be performed through the dummy light filters and/or attenuator path. It is further noted that although the above configuration is illustratively depicted, other sorts of configurations are contemplated in accordance with the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for data transport using one or more secure reconfigurable branching units, comprising:
    receiving one or more signals from a first trunk terminal and a second trunk terminal by one or more branching units;
    preventing broadcasting for secure information delivery by dividing, within the branching unit, the one or more signals from the first trunk terminal and the second trunk terminal into two or more sections, blocking, using one or more Wavelength Selective Switches within the branching units, unintended signals on a trunk path, and sending the two or more sections to two or more different optical couplers;
    receiving one or more signals from a branch terminal by one or more branching units using two fiber pairs;
    dividing the one of more signals from the one or more branch terminals into two or more groups of optical sections, wherein one of the sections includes dummy light;
    merging the divided signals from the first trunk terminal, the second trunk terminal, and dummy light from the branch terminal; and
    sending a merged signal to the branch terminal.

2. The method as recited in claim 1, wherein power balance is maintained with no active light source at the branching unit by reusing the dummy light from incoming branching fibers to returning branching fibers.

3. The method as recited in claim 1, wherein each section of the divided one or more signals from the first trunk terminal and the second trunk terminal includes different wavelengths than other sections.

4. The method as recited in claim 1, wherein the divided signals from the first trunk terminal, the second trunk terminal, and dummy light from the branch terminal are merged using the optical coupler.

5. The method as recited in claim 1, wherein the dividing the one or more signals from the first trunk terminal and the second trunk terminal is performed using one or more Wavelength Selective Switches, and each channel passes through the one or more Wavelength Selective Switches twice.

6. The method as recited in claim 1, wherein the BU is fully reconfigurable in all channels by setting each of one or more 1:2 Wavelength Division Multiplexer channels to one of a port one or a port two independently, and delivers $2^K$ configurations for each source terminal, wherein K is a number of channels.

7. The method as recited in claim 1, wherein the dividing the one or more signals from the first trunk terminal and the second trunk terminal is performed using one or more optical splitters and one or more wavelength blockers.

8. The method as recited in claim 7, wherein the one or more wavelength blockers block unwanted channels from reaching an unintended destination.

9. The method as recited in claim 1, wherein the dividing the one or more signals from the first trunk terminal and the second trunk terminal is performed using two or more Wavelength Selective Switches,
    wherein each of the one two or more Wavelength Selective Switches are configured to be concurrently controlled, and
    wherein each channel passes through each of the two or more Wavelength Selective Switches twice.

10. A system for data transport using one or more secure reconfigurable branching units, comprising:
    one or more branching units configured to receive one or more signals from a first trunk terminal and a second trunk terminal, the one or more branching units being further configured to:
        prevent broadcasting for secure information delivery by dividing, within the branching unit, the one or more signals from the first trunk terminal and the second trunk terminal into two or more sections, blocking, using one or more Wavelength Selective Switches within the branching units, unintended signals on a trunk path, and sending the two or more sections to two or more different optical couplers;
        receive one or more signals from a branch terminal using two fiber pairs;
        divide the one of more signals from the one or more branch terminals into two or more groups of optical sections, wherein one of the sections includes dummy light;
        merge the divided signals from the first trunk terminal, the second trunk terminal, and dummy light from the branch terminal; and
        send a merged signal to the branch terminal.

11. The system as recited in claim 10, wherein power balance is maintained with no active light source at the branching unit by reusing the dummy light from incoming branching fibers to returning branching fibers.

12. The system as recited in claim 10, wherein each section of the divided one or more signals from the first trunk terminal and the second trunk terminal includes different wavelengths than other sections.

13. The system as recited in claim 10, wherein the divided signals from the first trunk terminal, the second trunk terminal, and dummy light from the branch terminal are merged using the optical coupler.

14. The system as recited in claim 10, wherein the dividing the one or more signals from the first trunk terminal and the second trunk terminal is performed using one or more Wavelength Selective Switches, and each channel passes through the one or more Wavelength Selective Switches twice.

15. The system as recited in claim 10, wherein the BU is fully reconfigurable in all channels by setting each of one or more 1:2 Wavelength Division Multiplexer channels to one of a port one or a port two independently, and delivers $2^K$ configurations for each source terminal, wherein K is a number of channels.

16. The system as recited in claim 10, wherein the dividing the one or more signals from the first trunk terminal and the second trunk terminal is performed using one or more optical splitters and one or more wavelength blockers.

17. The system as recited in claim 16, wherein the one or more wavelength blockers block unwanted channels from reaching an unintended destination.

18. The system as recited in claim 14, wherein the one or more Wavelength Selective Switches are configured to provide full reconfigurability.

19. The system as recited in claim 10, the dividing the one or more signals from the first trunk terminal and the second trunk terminal being performed using two or more Wavelength Selective Switches,
  wherein each of the one two or more Wavelength Selective Switches are configured to be concurrently controlled, and
  wherein each channel passes through each of the two or more Wavelength Selective Switches twice.

20. A method for data transport using one or more secure reconfigurable branching units, comprising:
  receiving one or more signals from a first trunk terminal and a second trunk terminal by one or more branching units;
  preventing broadcasting for secure information delivery by dividing, within the branching unit, the one or more signals from the first trunk terminal and the second trunk terminal into two or more sections, blocking, within the branching units, unintended signals on a trunk path, and sending the two or more sections to two or more optical couplers, the dividing and blocking being performed using two or more Wavelength Selective Switches,
    wherein each of the one two or more Wavelength Selective Switches are configured to be concurrently controlled, and
    wherein each channel passes through each of the two or more Wavelength Selective Switches twice;
  receiving one or more signals from a branch terminal by one or more branching units using two fiber pairs;
  dividing the one of more signals from the one or more branch terminals into two or more groups of optical sections, wherein one of the sections includes dummy light;
  merging the divided signals from the first trunk terminal, the second trunk terminal, and dummy light from the branch terminal; and
  sending a merged signal to the branch terminal.

* * * * *